(12) United States Patent
Lee et al.

(10) Patent No.: US 12,199,310 B2
(45) Date of Patent: Jan. 14, 2025

(54) TERMINAL BUSBAR FOR IMPROVING SAFETY, AND BATTERY MODULE AND BATTERY PACK COMPRISING SAME

(71) Applicant: LG ENERGY SOLUTION, LTD., Seoul (KR)

(72) Inventors: Han-Young Lee, Daejeon (KR); Yeo-Min Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 550 days.

(21) Appl. No.: 17/608,428

(22) PCT Filed: Jan. 6, 2020

(86) PCT No.: PCT/KR2020/000202
§ 371 (c)(1),
(2) Date: Nov. 2, 2021

(87) PCT Pub. No.: WO2020/251128
PCT Pub. Date: Dec. 17, 2020

(65) Prior Publication Data
US 2022/0231383 A1 Jul. 21, 2022

(30) Foreign Application Priority Data
Jun. 11, 2019 (KR) .................. 10-2019-0068725

(51) Int. Cl.
*H01M 50/526* (2021.01)
*H01M 50/522* (2021.01)
*H01M 50/524* (2021.01)

(52) U.S. Cl.
CPC ....... *H01M 50/526* (2021.01); *H01M 50/522* (2021.01); *H01M 50/524* (2021.01); *H01M 2220/20* (2013.01)

(58) Field of Classification Search
CPC ............. H01M 50/526; H01M 50/522; H01M 50/524; H01M 2220/20
See application file for complete search history.

(56) References Cited

U.S. PATENT DOCUMENTS

| 2001/0020537 A1* | 9/2001 | Ueno ....................... C08K 3/38 528/4 |
| 2006/0032667 A1* | 2/2006 | Sato .................... H01M 50/526 174/257 |

(Continued)

FOREIGN PATENT DOCUMENTS

| CN | 101369671 A | 2/2009 |
| CN | 102315408 A | 1/2012 |

(Continued)

OTHER PUBLICATIONS

International Search Report for PCT/KR2020/000202 (PCT/ISA/210) mailed on Apr. 21, 2020.

(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

A terminal busbar includes a coupling portion that is approximately in the shape of a plate having a small thickness relative to a length and a width, and a terminal portion that is bent in a vertical direction at one end of the coupling portion. The coupling portion includes a first metal layer, a material layer and a second metal layer stacked in a sequential order along an extension direction of the terminal portion, the material layer is conductive in a normal condition, but can act as resistance when temperature rises, and the material layer includes a gas generating material that decomposes at a predetermined temperature or above to produce gas, which increases resistance. The first metal (Continued)

layer is integrally formed with the terminal portion, and the second metal layer provides a connect surface with an electrode lead of the battery cell.

15 Claims, 15 Drawing Sheets

(56) References Cited

U.S. PATENT DOCUMENTS

| | | |
|---|---|---|
| 2009/0047575 A1 | 2/2009 | Abe et al. |
| 2011/0177381 A1 | 7/2011 | Oya et al. |
| 2012/0009461 A1 | 1/2012 | Kim et al. |
| 2013/0089996 A1* | 4/2013 | Zhao .................. H01R 11/288 439/212 |
| 2017/0036132 A1* | 2/2017 | Yang .................. A63H 33/042 |
| 2017/0125774 A1 | 5/2017 | Choi et al. |
| 2017/0237060 A1 | 8/2017 | Inoue et al. |
| 2018/0026256 A1* | 1/2018 | Inoue .................. H01M 50/581 429/61 |
| 2018/0194235 A1 | 7/2018 | Kim et al. |
| 2020/0127337 A1 | 4/2020 | Kim et al. |
| 2021/0242548 A1 | 8/2021 | Lee et al. |

FOREIGN PATENT DOCUMENTS

| | | | |
|---|---|---|---|
| EP | 3 588 623 A1 | | 1/2020 |
| JP | 2-117083 A | | 5/1990 |
| JP | 4809517 B2 | * | 11/2011 |
| KR | 10-2011-0067027 A | | 6/2011 |
| KR | 10-2012-0004189 A | | 1/2012 |
| KR | 10-2012-0070851 A | | 7/2012 |
| KR | 10-2013-0064031 A | | 6/2013 |
| KR | 10-2015-0113827 A | | 10/2015 |
| KR | 10-2016-0068722 A | | 6/2016 |
| KR | 10-2017-0103232 A | | 9/2017 |
| KR | 20180138028 A | * | 12/2018 |
| KR | 10-2019-0059831 A | | 5/2019 |
| WO | WO 2015/012187 A1 | | 1/2015 |
| WO | WO 2018/155281 A1 | | 8/2018 |
| WO | WO-2019103310 A1 | * | 5/2019 ........ H01M 10/0525 |
| WO | WO 2020/116799 A1 | | 6/2020 |

OTHER PUBLICATIONS

Extended European Search Report for European Application No. 20823314.8, dated May 27, 2022.

* cited by examiner

TERMINAL BUSBAR FOR IMPROVING SAFETY, AND BATTERY MODULE AND BATTERY PACK COMPRISING SAME

TECHNICAL FIELD

The present disclosure relates to a battery module, and more particularly, to a battery module for shutting off the flow of current when the temperature rises. In addition, the present disclosure relates to a terminal busbar for use in the battery module, and a battery pack comprising the battery module.

The present application claims priority to Korean Patent Application No. 10-2019-0068725 filed in the Republic of Korea on Jun. 11, 2019, the disclosures of which are incorporated herein by reference.

BACKGROUND ART

Currently, commercially available secondary batteries include nickel-cadmium batteries, nickel-hydrogen batteries, nickel-zinc batteries, lithium secondary batteries and the like. Among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery mainly uses lithium-based oxide and a carbon material for a positive electrode active material and a negative electrode active material respectively. The lithium secondary battery includes an electrode assembly in which unit cells are assembled, each unit cell including a positive electrode plate having a positive electrode current collector coated with the positive electrode active material and a negative electrode plate having a negative electrode current collector coated with the negative electrode active material and a separator interposed between, and a hermetically sealed packaging material or battery case in which the electrode assembly is received together with an electrolyte solution. Lithium secondary batteries are classified into can-type secondary batteries in which the electrode assembly is embedded in a metal can, and pouch-type secondary batteries in which the electrode assembly is embedded in a pouch of an aluminum laminate sheet, according to the shape of the battery case.

More recently, secondary batteries are being widely used in not only small devices such as portable electronic products but also medium- and large-scale devices such as vehicles and energy storage systems (ESSs). For use in medium- and large-scale devices, many secondary batteries are electrically connected to construct a battery module or a battery pack to increase the capacity and output. In particular, pouch-type secondary batteries are widely used in medium- and large-scale devices because they are easy to stack and lightweight. A pouch-type secondary battery has a structure, in which the electrode assembly having the connected electrode lead is received in the pouch case together with the electrolyte solution, and the pouch case is hermetically sealed. A portion of the electrode lead is exposed to the outside of the pouch case, and the exposed electrode lead is electrically connected to a device in which the secondary battery is mounted, or is used to electrically connect secondary batteries to each other.

FIG. 1 shows part of a battery module manufactured by connecting pouch-type battery cells. For example, two pouch-type battery cells connected in series is shown.

As shown in FIG. 1, the pouch-type battery cells 10, 10' have two electrode leads 40, 40' extending out of a pouch case 30. The electrode leads 40, 40' are classified into the positive (+) lead and the negative (−) lead according to the electrical polarity, and electrically coupled to an electrode assembly 20 sealed inside the pouch case 30. That is, the positive lead is electrically connected to a positive electrode plate of the electrode assembly 20, and the negative lead is electrically connected to a negative electrode plate of the electrode assembly 20.

There are many connection methods for the battery cells 10, 10' within the battery module 1, and FIG. 1 shows bending the electrode leads 40, 40', placing the electrode leads 40, 40' on a busbar 50 and performing laser welding to connect the electrode lead 40 of the battery cell 10 and the electrode lead 40' of the battery cell 10' adjacent to the battery cell 10.

Meanwhile, the lithium secondary battery may explode when overheated. Particularly, in the case of the battery module or the battery pack used by connecting a plurality of high capacity secondary battery cells in electric vehicle applications including Electric Vehicles (EVs), Hybrid Electric Vehicles (HEVs) and Plug-in Hybrid Electric Vehicles (PHEVs), an explosion may cause a very big accident, so it is very important to ensure safety.

The main cause of a rapid rise in temperature of the lithium secondary battery is a flow of short circuit current. The short circuit current usually happens when a short circuit occurs in an electronic device connected to the secondary battery, and when a short circuit phenomenon occurs in the lithium secondary battery, rapid electrochemical reactions occur in the positive electrode and the negative electrode to produce heat. The temperature of the battery cell rises at a very high rate due to the heat, and eventually a fire occurs. Particularly, in the case of the battery module or the battery pack including a plurality of battery cells, heat generated from any one battery cell spreads out and affects the neighboring battery cells, causing a greater danger.

To shut off the current in order to prevent explosion when the internal temperature of the secondary battery rises, a positive temperature coefficient (PTC) device and a fuse have been suggested. However, a separate mounting space in the battery module or the battery pack is needed.

The explosion of the battery module or the battery pack may cause damage to an electronic device or a vehicle using the battery module or the battery pack, and besides, threatens the user's safety and may cause a fire, and accordingly, it is very important to ensure safety. When the secondary battery is overheated, the explosion and/or fire risk increases, and rapid combustion or explosion occurring due to overheat may cause human losses and financial losses. Accordingly, there is a need to adopt an approach to improve safety during the use of the secondary battery.

DISCLOSURE

Technical Problem

The present disclosure is directed to providing a component for shutting off the current to improve the safety of the battery module when the temperature rises.

The present disclosure is further directed to providing a battery module and a battery pack with improved safety using the component.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

The present disclosure proposes a new terminal busbar as a component for improving safety of a battery module.

The terminal busbar according to the present disclosure includes a coupling portion that is a plate having a small thickness relative to a length and a width, and a terminal portion that is-bent in a vertical direction at one end of the coupling portion. The coupling portion includes a first metal layer, a material layer and a second metal layer stacked in a sequential order along an extension direction of the terminal portion, the material layer is conductive in a normal operating conditions, but acts as resistance when temperature rises above a predetermined temperature, and the material layer includes a gas generating material that decomposes at the predetermined temperature or above to produce gas, which increases resistance. The first metal layer is integrally formed with the terminal portion, and the second metal layer provides a connect surface with an electrode lead of the battery cell.

The terminal busbar may have an opening in the coupling portion, the opening through which the electrode lead passes.

The material layer may further include a conductive material and an adhesive.

The gas generating material may be melamine cyanurate.

The conductive material may be connected and immobilized by the adhesive, and when the gas is produced, the connection of the conductive material may be disconnected and the resistance may increase.

A method for manufacturing the terminal busbar may include the following steps. First, a metal element having a first metal layer integrally formed with a terminal portion and an L-shaped cross section is prepared. A material layer is formed on the first metal layer. Additionally, a second metal layer is stacked on the material layer.

When the material layer includes the gas generating material, a conductive material and an adhesive, the method may further include pressing to adhere together after stacking the second metal layer on the material layer.

A battery module according to the present disclosure includes the terminal busbar.

The battery module includes at least two battery cells, wherein each battery cell of the at least two battery cells is a pouch-type secondary battery including electrode leads of opposite polarities exposed to outside of a pouch case, and further includes a terminal busbar connected to the electrode lead of at least one of the battery cells.

In the battery module, a current flow path into the battery module from outside of the battery module may go through the terminal portion, the first metal layer, the material layer, the second metal layer and the electrode leads in that order.

The present disclosure further provides a battery pack including at least two battery modules. The battery pack further includes an inter-busbar connecting the terminal portion of the terminal busbar of any one of the battery modules to the terminal portion of the terminal busbar of the other battery module so as to connect the battery modules. The battery pack may further include a pack case to package the battery modules.

Further, the present disclosure provides a vehicle including at least one battery pack according to the present disclosure.

Advantageous Effects

According to the present disclosure, the battery module is constructed by changing the terminal busbar, while leaving the battery cell as it is. When the temperature rises, the terminal busbar increases in resistance to shut off the current flow through the terminal busbar. Accordingly, the battery module according to the present disclosure may shut off the current flow when it is overheated while in use, thereby ensuring the safety in abnormal situations.

To increase the resistance of the busbar, the busbar includes a material layer including a gas generating material, and when the temperature at which the gas generating material decomposes is reached, the current flow is shut off. Accordingly, even though the secondary battery protection circuit does not operate, it is possible to shut off the current flow to prevent the current from flowing any longer, for example, prevent the secondary battery from being charged, thereby increasing the safety of the battery module. The battery module of the present disclosure has the improved busbar to automatically shut off the current flow when the temperature rises, thereby achieving the overcharge prevention function of the secondary battery protection circuit and ensuring the safety of the battery module.

According to the present disclosure, it is possible to provide the battery module using the terminal busbar for safety in the connection of the battery cells to form an electrical connection path. When an event occurs, for example, in a situation in which an abnormal temperature is reached, as the gas generating material included in the material layer within the terminal busbar decomposes, the resistance increases. As a result, the electrical connection of the battery cells is disconnected and the current flow is shut off, thereby ensuring the safety of the battery module.

Particularly, the material layer including the gas generating material that decomposes at a predetermined temperature or above to produce gas is interposed between the first metal layer and the second metal layer in the terminal busbar, to increase the resistance between the second metal layer where the terminal busbar is connected to the electrode lead and the first metal layer where the terminal busbar is not connected to the electrode lead with respect to the material layer, thereby preventing the current from flowing. The terminal busbar is used, especially, to connect adjacent battery modules. In case that the terminal busbar connects the battery cells between adjacent battery module, when the temperature rises, the current does not flow through the terminal busbar, thereby improving the safety.

According to the present disclosure, it is possible to ensure safety through improvements in the terminal busbar of the battery module. Instead of the existing terminal busbar, the proposed terminal busbar is used, and the existing battery module manufacturing process can be used, and thus it is possible to ensure the safety of the battery module without a big change in the process. As the battery cell itself uses the existing manufacturing process, there is no need to change the process or adjust the mass-production process.

As described above, according to the present disclosure, the current is allowed to flow in normal situations, similar battery module performance to the existing one is provided, and when the temperature rises above a predetermined level in abnormal situations, the current flow is shut off, thereby improving the safety of the battery module. Accordingly, it is possible to improve the safety of the battery module, a battery pack including the battery module, and a vehicle including the battery pack.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

Figure 1:
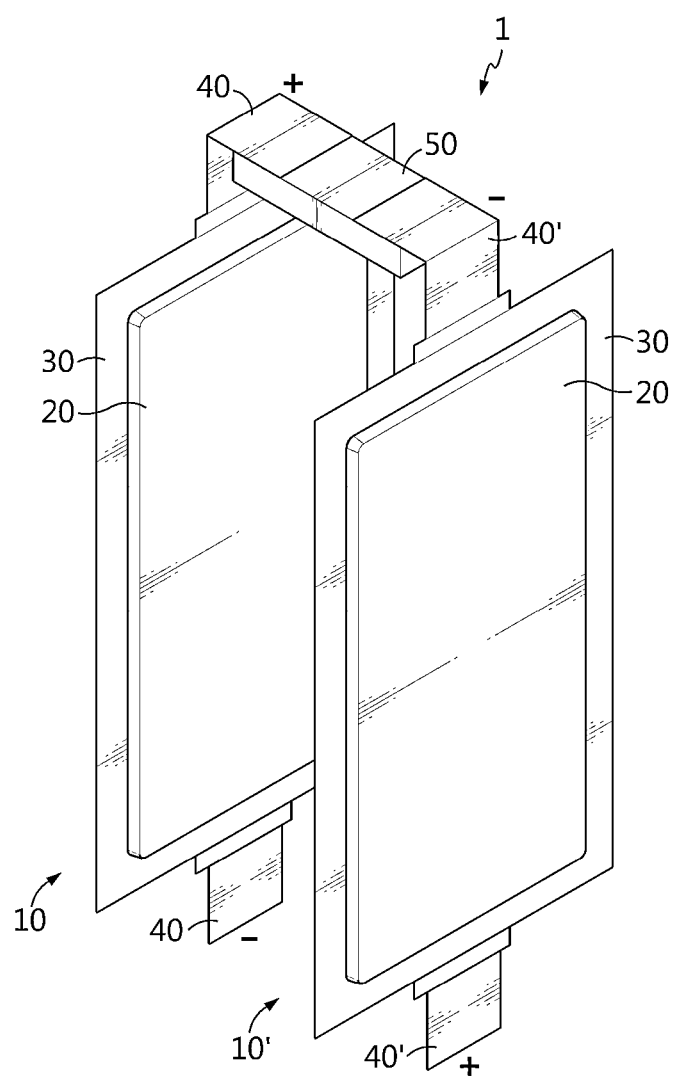
FIG. 1 schematically shows a conventional battery module.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, and should be interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application. In the drawings, like reference numerals denote like elements.

In the embodiments described below, a secondary battery refers to a lithium secondary battery. Here, the lithium secondary battery refers collectively to secondary batteries in which lithium ions act as working ions during charging and discharging, causing electrochemical reactions at the positive electrode plate and the negative electrode plate.

Meanwhile, it should be interpreted as that even if the name of the secondary battery changes depending on the type of the electrolyte or separator used in the lithium secondary battery, the type of the battery case used to package the secondary battery and the internal or external structure of the lithium secondary battery, the lithium secondary battery covers any secondary battery using lithium ions as working ions.

The present disclosure may be also applied to secondary batteries other than lithium secondary batteries. Accordingly, it should be interpreted that the present disclosure covers any type of secondary battery to which the technical aspects of the present disclosure may be applied, though working ions are not lithium ions.

Hereinafter, a terminal busbar embodiment of the present disclosure will be described with reference to FIGS. 2 and 3.

Figure 2:
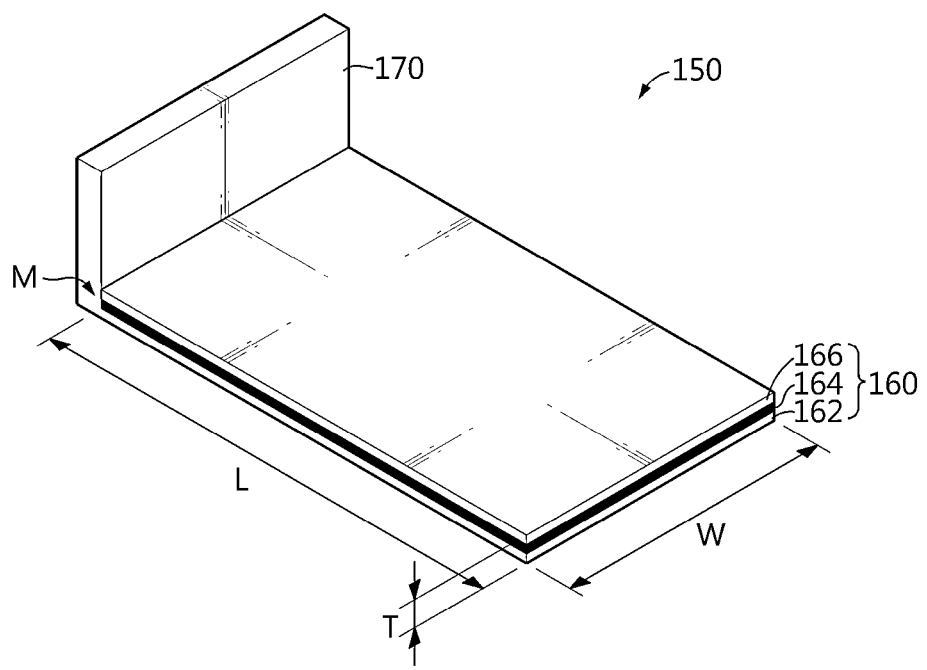
FIG. 2 shows a terminal busbar according to an embodiment of the present disclosure.

FIG. 2 shows a terminal busbar according to an embodiment of the present disclosure. FIG. 3 shows a terminal busbar according to another embodiment of the present disclosure.

First, referring to FIG. 2, the terminal busbar 150 includes a coupling portion 160 and a terminal portion 170. The terminal portion 170 is a portion that is bent in the vertical direction at one end of the coupling portion 160.

The coupling portion 160 is an approximately plate-shaped element having a small thickness T relative to a length L and a width W. The coupling portion 160 includes a first metal layer 162, a material layer 164 and a second metal layer 166 stacked in that order from bottom to top along the extension direction of the terminal portion 170, and the material layer 164 is conductive in a normal condition, and when the temperature rises, may act as resistance. The first metal layer 162, the material layer 164 and the second metal layer 166 are stacked along the thicknesswise T direction. The thickness of the terminal portion 170 may be equal to the thickness T of the coupling portion 160. The first metal layer 162 is integrally formed with the terminal portion 170, and the second metal layer 166 provides a connection surface with the electrode lead of the battery cell. The terminal portion 170 may be used for an external input or to connect between battery modules. In general, a component that is connected to the electrode lead to form an electrical wiring is referred to as a busbar, so the component including the coupling portion 160 and the terminal portion 170 may be just called a busbar, but as opposed to other busbars, in addition to the coupling portion 160, the component further includes the terminal portion 170, and due to this difference, it is referred to as a terminal busbar in the present disclosure.

The first metal layer 162 and the second metal layer 166 may include metal having high electrical conductivity. For example, the first metal layer 162 and the second metal layer 166 may include at least one of aluminum, copper, nickel and SUS. The first metal layer 162 and the second metal layer 166 may include various types of materials used as the existing busbar materials. The first metal layer 162 and the second metal layer 166 may be a same type or different types.

The material layer 164 sandwiched between the first metal layer 162 and the second metal layer 166 includes a gas generating material that decomposes at a predetermined temperature or above to produce gas and increase the resistance. Preferably, the material layer 164 includes the gas generating material, a conductive material and an adhesive. The conductive material is connected and immobilized by the adhesive, and when the gas generating material produces gas, the connection of the conductive material may be disconnected, and the resistance may increase. The gas generating material may be a volume expandable resin.

The gas generating material is preferably melamine cyanurate that is a type of volume expandable resin. Melamine cyanurate is a material used as a nitrogen-phosphorus flame retardant containing a combination of nitrogen and phosphorus, and is available as a raw material having the average particle size on the level of a few tens of um through different manufactures.

Melamine cyanurate primarily used for flame retardancy undergoes endothermic decomposition of above 300° C. Melamine cyanurate decomposes into melamine and cyanuric acid. Evaporated melamine releases inactive nitrogen gas. The decomposition temperature is adjusted by adjusting the molecular weight of melamine cyanurate. The structural formula of melamine cyanurate is as below:

[Structural formula]

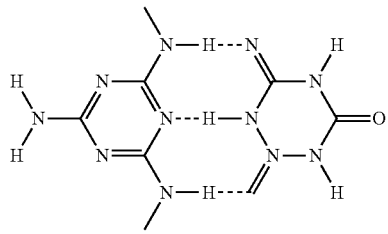

The conductive material is not limited to any particular type of material having the conductive property, and may include, for example, graphite such as natural graphite or artificial graphite; carbon black such as carbon black, acetylene black, ketjen black, channel black, furnace black, lamp black and thermal black; conductive fibers such as carbon fibers or metal fibers; metal powder such as fluorocarbon, aluminum, silver and nickel powder; conductive whiskers such as zinc oxide and potassium titanate; conductive metal oxide such as titanium oxide; and conductive materials such as polyphenylene derivatives.

The adhesive is a substance that assists in binding the gas generating material and the conductive material and binding to the first metal layer 162 and the second metal layer 166. Examples of the adhesive may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ter polymer (EPDM), sulfonated EPDM, styrene-butadiene rubber, fluorine rubber and a variety of copolymers.

When the temperature rises above a predetermined level, for example, above 300° C., in abnormal situations, melamine cyanurate in the material layer 164 interposed between the first metal layer 162 and the second metal layer 166 decomposes to produce $N_2$ gas. Accordingly, the material layer 164 increases in resistance and acts as a resistance layer.

A method for manufacturing the terminal busbar 150 may include the following steps. First, a metal element M is prepared such that the first metal layer 162 is integrally formed with the terminal portion 170 and its cross section has an L shape. To make the total thickness the thickness T, the metal element M may be prepared such that the first metal layer 162 is thinner than the terminal portion 170. The metal element M may be made by processing a metal plate. Subsequently, the material layer 164 is formed on the first metal layer 162. Additionally, the second metal layer 166 is stacked on the material layer 164. The thickness of each of the material layer 164 and the second metal layer 166 may be set so that the total thickness when the material layer 164 and the second metal layer 166 are stacked on the first metal layer 162 satisfies the thickness T.

When the material layer 164 includes the gas generating material, the conductive material and the adhesive, the method may further include pressing to adhere together after stacking the second metal layer 166 on the material layer 164.

The material layer 164 may be formed by applying a paste or a slurry prepared by mixing the gas generating material, the conductive material and the adhesive onto the first metal layer 162. When the second metal layer 166 is placed thereon and pressed upward and downward, the terminal busbar 150 having the material layer 164 interposed between the two metal layers 162, 166 may be obtained. Additional thermal treatment may be performed where necessary.

The thickness T of the coupling portion 160 may be equal to the thickness of the existing busbar. The first metal layer 162 and the second metal layer 166 may be made of the same material as the existing busbar. When the conductive material in the material layer 164 is equal to or higher than the existing busbar material, the electrical conductivity of the material layer 164 in the normal condition may become similar to the electrical conductivity of the existing busbar.

Accordingly, in normal situations, conductivity of the material layer 164 in the terminal busbar 150 is maintained, and the battery module performance is exhibited on a similar level to the battery module performance when the existing busbar is used. When the temperature rises above a predetermined level in abnormal situations, the resistance of the material layer 164 increases, and is enough to shut off the current flow. Accordingly, when the temperature rises, the material layer 164 acts as resistance to shut off the current, thereby improving the safety of a battery module including the same.

Figure 3:
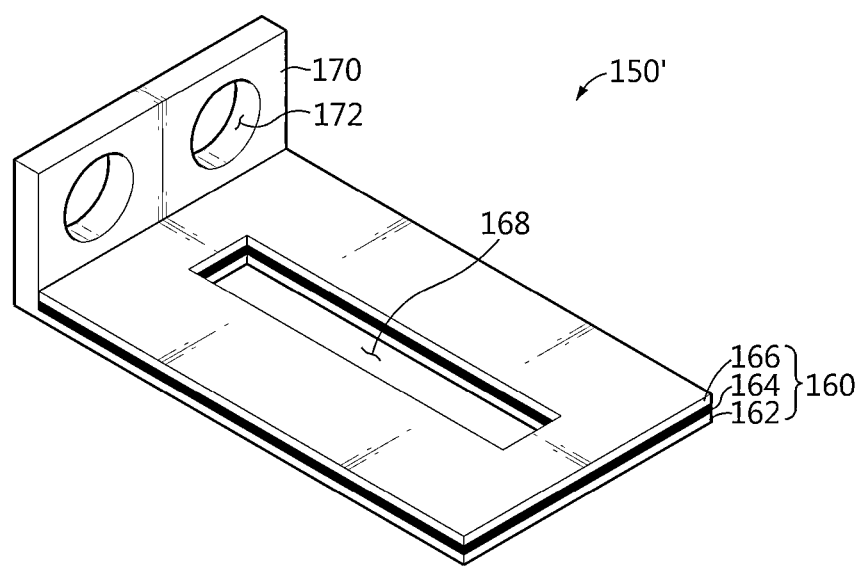
FIG. 3 shows a terminal busbar according to another embodiment of the present disclosure.

The terminal busbar 150' shown in FIG. 3 is basically the same as the terminal busbar 150 of FIG. 2. The terminal busbar 150' further includes an opening 168 in the coupling portion 160, the opening 168 through which the electrode lead passes. The number of openings 168 may be different depending on the number of electrode leads or the connection method. The terminal portion 170 further includes a hole 172. The hole 172 is used for an external input or to connect between battery modules. The number of holes 172 may be different depending on the connection method.

The terminal busbar 150 or 150' provided by the present disclosure has a triple structure of the metal–the volume expandable resin+the conductive material+the adhesive–the metal, where the electrode lead is connected by welding (corresponding to the long axis of the busbar). In normal situations, the current may flow between the terminal busbar and the electrode lead, but the volume expandable resin in the volume expandable resin+the conductive material+the adhesive expands the volume at high temperature, forming a gap in the conductive material, resulting in increased resistance. Accordingly, the resistance between the terminal busbar and the electrode lead increases, which prohibits the current flow. As described above, the current flow through the terminal busbar is prohibited at abnormal temperature, and thus a battery module including the terminal busbar has improved safety.

Figure 4:
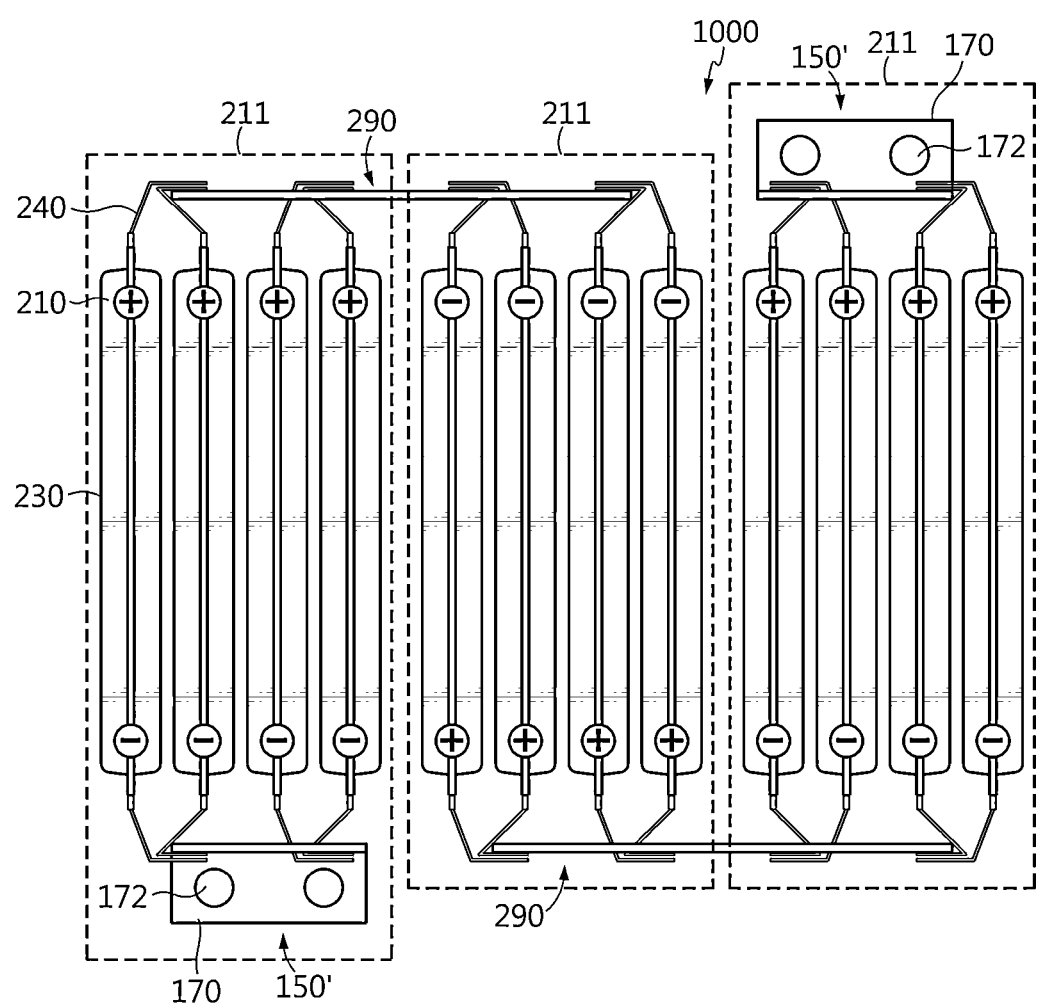
FIG. 4 schematically shows a battery module including a terminal busbar according to another embodiment of the present disclosure.
Figure 5:
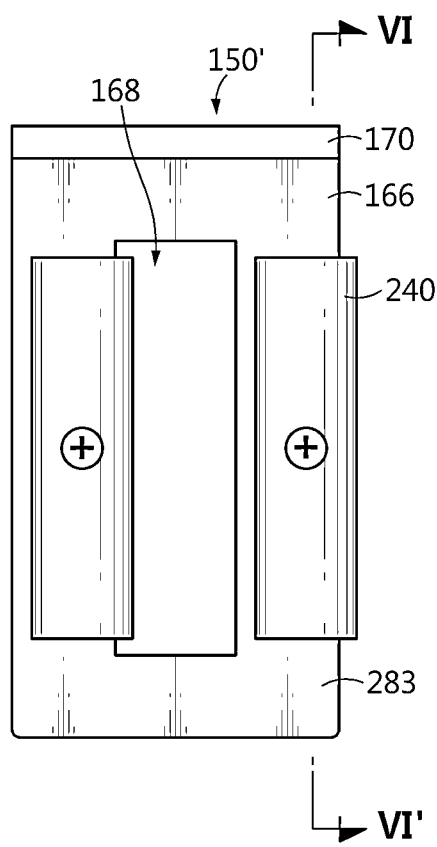
FIG. 5 is a front view of the terminal busbar included in the battery module of FIG. 4.
Figure 6:
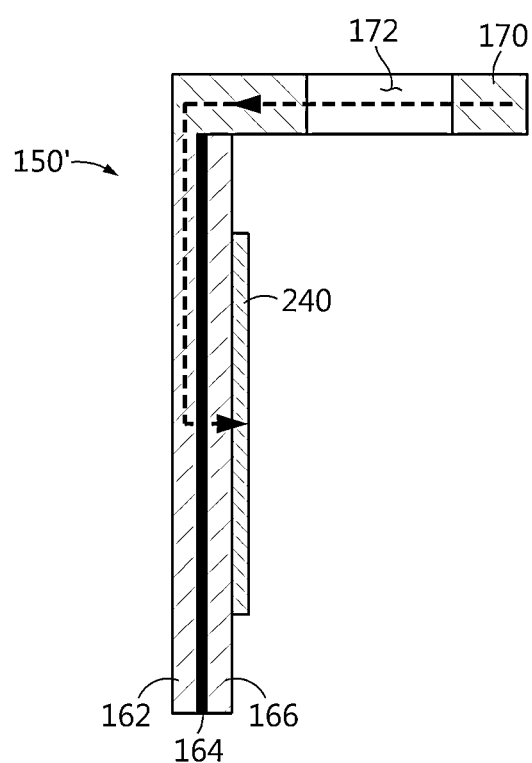
FIG. 6 is a cross-sectional view.
Figure 7:
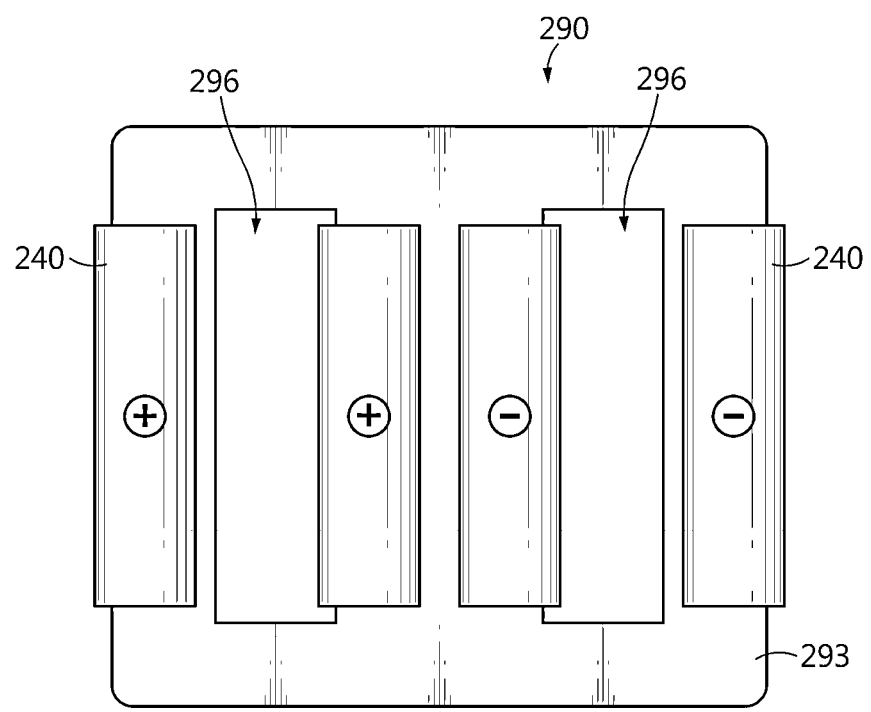
FIG. 7 is a front view of the busbar included in the battery module of FIG. 4.

FIG. 4 schematically shows a battery module including the terminal busbar according to another embodiment of the present disclosure. FIG. 5 is a front view of the terminal busbar included in the battery module of FIG. 4, and FIG. 6 is a cross-sectional view of FIG. 5 taken along the line VI-VI'. FIG. 7 is a front view of the terminal busbar included in the battery module of FIG. 4.

The battery module 1000 of FIG. 4 has a 4P3S connection. That is, three cell banks 211 are connected in series S, and each cell bank 211 includes four battery cells 210 connected in parallel P. Each battery cell 210 may be a pouch-type battery cell as shown in FIG. 1. 4P3S is provided by way of illustration, and the battery module of the present disclosure is not limited thereto.

The battery cell 210 is a secondary battery, and has two electrode leads 240 extending out of a pouch case 230. The electrode leads 240 are classified into the positive (+) lead and the negative (−) lead according to the electrical polarity and electrically connected to an electrode assembly (not shown) received in the hermetically sealed pouch case 230. That is, the positive lead is electrically connected to the positive electrode plate of the electrode assembly, and the negative lead is electrically connected to the negative electrode plate of the electrode assembly. As described above, the battery cell 210 is a pouch-type secondary battery in which one end of the electrode leads 240 of the opposite polarities of the battery cell 210 is connected to each of two ends of the electrode assembly, the electrode assembly is received in the pouch case 230 together with the electrolyte solution, the pouch case 230 is hermetically sealed, and the other end of the electrode leads 240 is exposed to the outside of the pouch case 230.

The electrode leads 240 extend out of the two ends of the battery cell 210. Within the cell banks 211 connected in parallel, the electrode leads 240 are stacked such that the electrode leads 240 of the same polarity are arranged next to each other. Additionally, the electrode leads 240 are stacked in opposite polarities between the cell banks 211. There may be many methods for connecting the electrode leads 240, and FIGS. 4 to 7 show that the other end of the electrode lead 240 is bent left or right to provide a flat contact surface, which is placed over a busbar 290 or the terminal busbar 150' and connected by welding.

Referring to FIGS. 4 to 7, the terminal busbar 150' connects the electrode leads 240 of the same polarity in one cell bank 211. The busbar 290 connects the electrode leads 240 of the opposite polarities between the two cell banks 211. In this embodiment, two terminal busbars 150' and two busbars 290 are provided.

The terminal busbar 150' and the busbar 290 are disposed between the bent parts of each electrode lead 240, parallel to the stack direction of the battery cells 210, and they are connected to the electrode leads 240. The connection method may include methods commonly used in the art, for example, ultrasonic welding and laser welding, but is not limited thereto.

The terminal busbar 150' and the busbar 290 have openings 168, 296 through which the electrode leads 240 pass. The description made with reference to FIGS. 2 and 3 is equally applied to the terminal busbar 150'.

Seeing the front view of the terminal busbar 150' as shown in FIG. 5 and the front view of the busbar 290 as shown in FIG. 7, an approximately O shape is formed around the opening 168, 296. After the electrode lead 240 passes through the opening 168, 296 formed at the center and is bent, welding of the electrode lead 240 and the busbar 150', 290 is linearly performed along the long axis of the busbar 150', 290.

Particularly, as shown in FIGS. 4 and 5, four electrode leads 240 may be coupled to the second metal layer 166 of the coupling portion 160 of one terminal busbar 150'. As described above, when four electrode leads 240 are coupled to the coupling portion 160 of one terminal busbar 150', two of the four electrode leads 240 may be stacked each other, bent left through the opening 168 and connected to the left side of the coupling portion 160, and the remaining two electrode leads 240 may be bent left and connected to the right side of the coupling portion 160.

In this instance, the four electrode leads 240 are each provided in four different battery cells 210, and they have the same polarity. For example, the electrode leads 240 connected to the top right terminal busbar 150' of FIG. 4 are all positive electrode leads. Accordingly, the top right terminal busbar 150' of FIG. 4 may be referred to as a positive electrode terminal busbar. The electrode leads 240 connected to the bottom left terminal busbar 150' of FIG. 4 are all negative electrode leads. Accordingly, the bottom left terminal busbar 150' of FIG. 4 may be all referred to as a negative electrode terminal busbar.

Referring to FIGS. 4 and 7, eight electrode leads 240 may be coupled to one busbar 290. As described above, when eight electrode leads 240 are coupled to one busbar 290, two of the eight electrode leads 240 are stacked each other, bent right and connected to the left side of the busbar 290, and the remaining two electrode leads 240 are stacked each other, bent right through the left opening 296 of the two openings 296 and connected to the left side of the central part of the busbar 290. The remaining two electrode leads 240 are stacked each other, bent left through the right opening 296 of the two openings and connected to the right side of the central part of the busbar 290. The remaining two electrode leads 240 are bent left and connected to the right side of the busbar 290.

In this instance, the eight electrode leads 240 are each provided in eight different battery cells 210, and four electrode leads 240 on the left side have the same polarity while four electrode leads 240 on the right side have opposite polarities. For example, the electrode leads 240 connected to the busbar 290 are four positive electrode leads and four negative electrode leads.

Particularly, a current flow path running through the terminal busbar 150' of the present disclosure will be described in detail with reference to FIG. 6. Referring to FIG. 6, the current flow path into the battery module 1000 from the outside of the battery module (1000 of FIG. 4) goes through the terminal portion 170, the first metal layer 162, the material layer 164, the second metal layer 166 of the terminal busbar 150' and then to the electrode leads 240. As described above, the material layer 164 is a material that is conductive in the normal condition, and may act as resistance when the temperature rises. When the temperature rises above a predetermined level, for example, above 300° C., in abnormal situations, melamine cyanurate decomposes in the material layer 164 to produce $N_2$ gas. Accordingly, the material layer 164 increases in resistance and acts as a resistance layer. Additionally, electrical connection may be disconnected through volume expansion.

Accordingly, in normal situations, conductivity of the material layer 164 in the terminal busbar 150' is maintained, and the battery module performance is exhibited on a similar level to the existing busbar. When the temperature rises above a predetermined level in abnormal situations, the resistance of the material layer 164 increases, which prohibits the current flowing to the terminal portion 170 and the first metal layer 162 from flowing to the material layer 164 and the second metal layer 166. Accordingly, it is possible to shut off the current flow to the electrode leads 240. Accordingly, when the temperature rises, the material layer 164 acts as resistance to shut off the current. Accordingly, even when the secondary battery protection circuit does not operate, it is possible to shut off the current flow to prevent the current from flowing any longer, for example, to prevent the secondary battery from being charged, thereby increasing the safety of the battery module 1000. As described above, the battery module 1000 of the present disclosure improves the terminal busbar to automatically shut off the current flow when the temperature rises, thereby achieving the overcharge prevention function of the secondary battery protection circuit and ensuring the safety of the battery module 1000. When the terminal busbar 150', not the busbar 290, is configured as described above, it is possible to prevent the current flow to the battery module 1000 from coming from an external device or other battery module.

The main cause of safety reduction caused by a rapid rise in the temperature of the lithium secondary battery is a short circuit current, and it is very important to ensure the safety of the battery module or the battery pack including battery cells connected to each other when a short circuit occurs. As the short circuit resistance is lower, a higher short circuit current flows, and high temperature heat is generated, and when the battery cell cannot withstand the high temperature heat, a fire occurs. When the short circuit resistance is very low, in some cases, a safe outcome is obtained, and when heat generated during the flow of large current exceeds 660° C., the electrode leads melt and the current flow is shut off, thereby ensuring safety. When the temperature is lower than 660° C., the electrode leads do not melt, the current flow continues, high temperature heat increases, and when the battery cell cannot withstand the high temperature heat, a fire occurs. In contrast, a large current may flow even in normal situations. In situations such as fast charging, sudden acceleration or startup of an electric vehicle, a large current flows in the battery module and high temperature heat is generated from the electrode leads, and in this normal situation, operating should never be done. To prevent this, it is necessary to shut off the current flow at the temperature of about 250° C. or above.

In this embodiment, when the battery module 1000 reaches about 300° C., gas is generated in the material layer 164 of the terminal busbar 150' to increase the resistance of the material layer 164. Accordingly, the shut off mechanism by the material layer 164 does not operate in the normal large current range, and is allowed to operate only when overheated above the temperature due to an actually occurred short circuit, thereby preventing a fire and explosion and ensuring safety. Additionally, as opposed to a PTC device or a fuse used to improve safety, it does not occupy the space in the module and does not reduce the energy density.

The battery module 1000 according to the present disclosure has high safety, and thus is suitable for a power source of medium- and large-scale devices requiring high temperature stability, long cycle characteristics and high rate characteristics. Preferable examples of the medium- and large-scale device may include, but are not limited to, power tools; electric vehicles including Electric Vehicles (EVs), Hybrid Electric Vehicles (HEVs) and Plug-in Hybrid Electric Vehicles (PHEVs); electric two wheelers including E-bikes and E-scooters; electric golf carts; and ESSs, which are powered on and work by power from an electric motor.

The terminal busbar 150' and the busbar 290 may have varying shapes and sizes to form a variety of electrical connection relationships. Additionally, an interconnect board (ICB) assembly in which the terminal busbar 150' and the busbar 290 are assembled on a plastic frame considering the wiring relationship is applied to the battery module manufacturing process, rather than the terminal busbar 150' and the busbar 290 used alone. The type of the frame and the type of the busbar combined with the frame are different depending on the connection relationship of the battery module. Accordingly, those skilled in the art will understand that a variety of variations may be made to the present disclosure.

Figure 8:
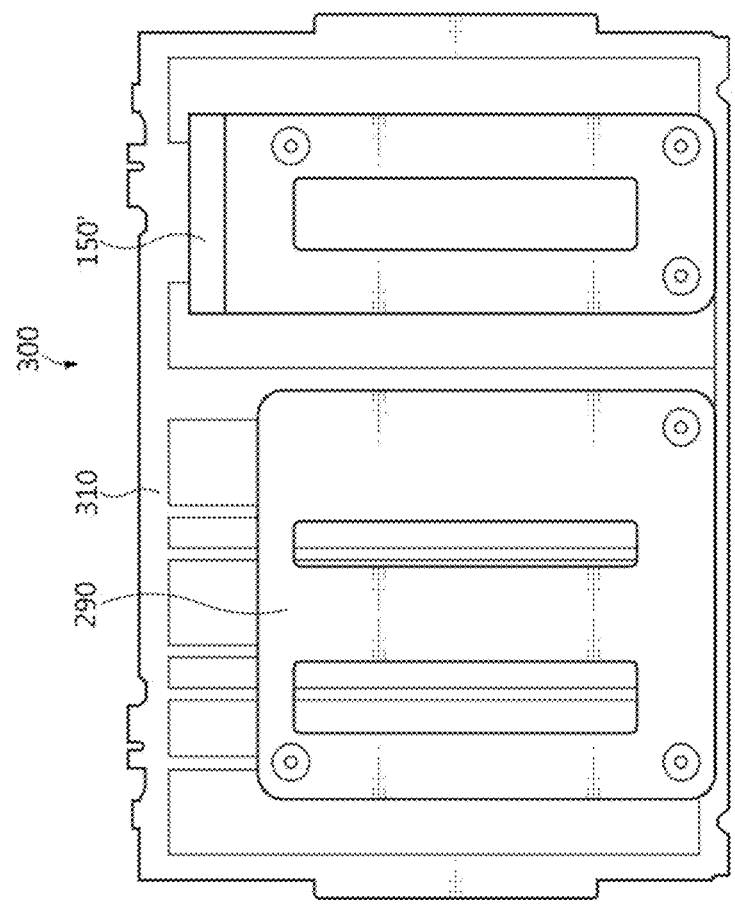
FIG. 8 is a front view of an experimentally manufactured interconnect board (ICB) assembly.

FIG. 8 is a photographic image of an experimentally manufactured interconnect board (ICB) assembly.

The ICB assembly 300 includes the frame 310, the busbar 290 and the terminal busbar 150'.

The terminal busbar 150' may be fixed to the frame 310 through piercing, and thus when the material layer 164 such as the volume expandable resin+the conductive material+the adhesive is horizontally sandwiched between the first metal layer 162 and the second metal layer 166 as proposed by the present disclosure, there is no sliding or layer separation problem between the volume expandable resin+the conductive material+the adhesive and the first metal layer 162, the volume expandable resin+the conductive material+the adhesive and the second metal layer 166.

As described above, according to the present disclosure, safety may be enhanced through improvements in the terminal busbar of the battery module. When the battery module 1000 is manufactured using the terminal busbar 150' according to the present disclosure in place of the existing busbar, stability is improved, and the existing battery cell manufacturing process is used, thereby eliminating the need to change the process or adjust the mass-production process.

As described above, according to the present disclosure, in normal situations, conductivity of the material layer 164 in the terminal busbar 150' is maintained, the battery module performance is exhibited on a similar level to the existing battery module, and when the temperature rises above a predetermined level in abnormal situations, the current flow is shut off, thereby improving the safety of the battery module 1000. Accordingly, it is possible to improve the safety of the battery module 1000, a battery pack including the same, and a vehicle including the battery pack.

Figure 9:
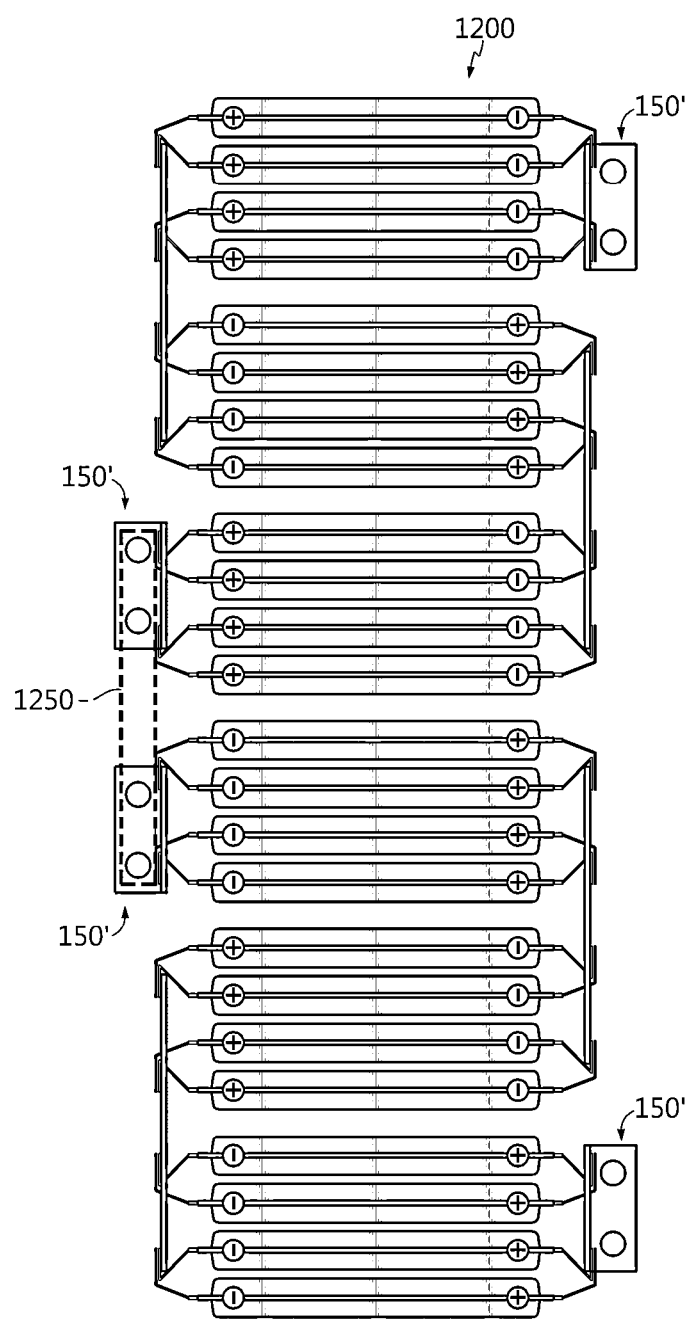
FIG. 9 is a diagram illustrating a battery pack according to still another embodiment of the present disclosure.

FIG. 9 is a diagram illustrating a battery pack according to still another embodiment of the present disclosure.

The battery pack 1200 includes at least two battery modules 1000 as described above. An inter-busbar 1250 connects the terminal portions 170 of the terminal busbars 150' between adjacent battery modules 1000. That is, the inter-busbar 1250 connects the terminal portion 170 of the terminal busbar 150' of any one of the at least two battery modules 1000 to the terminal portion 170 of the terminal busbar 150' of the other battery module 1000 so as to connect the battery modules 1000.

The inter-busbar 1250 may be in the shape of a plate that contacts the terminal portion 170 of the terminal busbar 150'. For a simple shape of the inter-busbar 1250, i.e., for the shortest distance between adjacent terminal busbars 150', the position of the terminal busbar 150' in the battery module 1000 may be adjusted. For example, the battery module 1000 of FIG. 4 is located at the bottom of FIG. 9, and the battery module formed in left-right mirror symmetry of the battery module 1000 of FIG. 4 is located at the top of FIG. 9.

In the structure of FIG. 9, the top right terminal busbar 150' is a negative electrode terminal busbar. The terminal portion 170 of the terminal busbar 150' has a negative electrode terminal electrically connected to an external terminal for an external input. The two terminal busbars 150' on the left side at the central part are a positive electrode terminal busbar and a negative electrode terminal busbar downwards from the top of FIG. 9. Accordingly, the inter-busbar 1250 connects the two terminal busbars 150' of opposite polarities in series. The bottom right terminal busbar 150' is a positive electrode terminal busbar. The terminal portion 170 of the terminal busbar 150' has a positive electrode terminal electrically connected to an external terminal for an external input.

Connection between the terminal busbar 150' and the inter-busbar 1250 may be accomplished by bolt-nut fastening using a hole 172 formed in the terminal portion 170 of the terminal busbar 150'. Accordingly, the inter-busbar 1250 may have another hole for bolt-nut fastening at the location that matches the hole 172.

The battery pack 1200 may further include a pack case to package the battery modules 1000. Additionally, in addition to the battery module 1000 and the pack case, the battery pack 1200 according to the present disclosure may further include various types of devices to control the charge/discharge of the battery module 1000, for example, a Battery Management System (BMS), a current sensor and a fuse.

Figure 10:
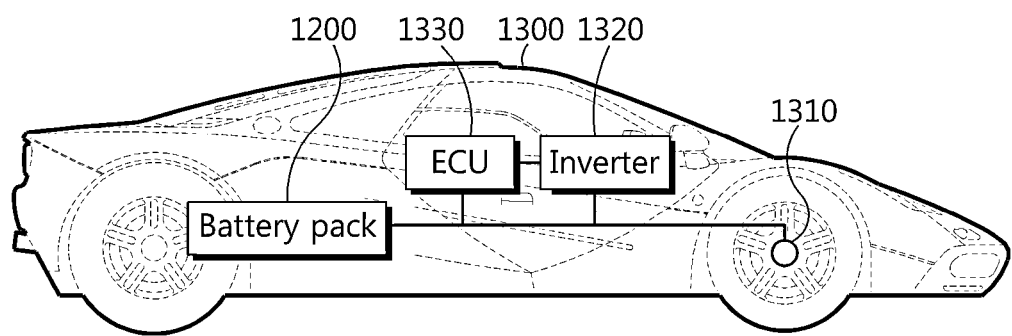
FIG. 10 is a diagram illustrating a vehicle according to yet another embodiment of the present disclosure.

FIG. 10 is a diagram illustrating a vehicle according to yet another embodiment of the present disclosure.

The battery pack 1200 may be provided in the vehicle 1300 as a fuel source of the vehicle 1300. For example, the battery pack 1200 may be provided in the vehicle 1300 such as an electric vehicle, a hybrid electric vehicle and other applications using the battery pack 1200 as a fuel source.

Preferably, the vehicle 1300 may be an electric vehicle. The battery pack 1200 may be used as an electrical energy source to supply power to a motor 1310 of the electric vehicle to drive the vehicle 1300. In this case, the battery pack 1200 has high nominal voltage of 100V or above. For hybrid vehicles, the battery pack 1200 is set to 270V.

The battery pack 1200 may be charged or discharged by an inverter 1320 by the operation of the motor 1310 and/or the internal combustion engine. The battery pack 1200 may be charged by the regenerative charger coupled to the brake. The battery pack 1200 may be electrically connected to the motor 1310 of the vehicle 1300 through the inverter 1320.

As previously described, the battery pack 1200 includes a BMS. The BMS estimates the state of the battery cells in the battery pack 1200, and manages the battery pack 1200 using the estimated state information. For example, the BMS estimate and manages the state information of the battery pack 1200 including the State Of Charge (SOC), the State Of Health (SOH), the maximum allowable input/output power and the output voltage of the battery pack 1200. Additionally, the BMS controls the charge or discharge of the battery pack 1200 using the state information, and besides, may estimate when to replace the battery pack 1200.

An Electronic Control Unit (ECU) 1330 is an electronic control device to control the state of the vehicle 1300. For example, the ECU 1330 determines torque information based on information of the accelerator, the brake and the speed, and controls the output of the motor 1310 according to the torque information. Additionally, the ECU 1330 sends a control signal to the inverter 1320 to charge or discharge the battery pack 1200 based on the state information of the battery pack 1200 such as SOC and SOH received by the BMS. The inverter 1320 allows the battery pack 1200 to be charged or discharged based on the control signal of the ECU 1330. The motor 1310 drives the vehicle 1300 based on the control information (for example, torque information) transmitted from the ECU 1330 using electrical energy of the battery pack 1200.

The vehicle 1300 includes the battery pack 1200 according to the present disclosure, and the battery pack 1200 includes the battery module 1000 with improved safety as described previously. Accordingly, as stability of the battery pack 1200 is improved, and the battery pack 1200 provides high stability and long-term use, the vehicle 1300 including the same is safe and easy to operate.

Additionally, it is obvious that the battery pack 1200 may be provided in any other device, apparatus and equipment such as Energy Storage System (ESS) and BMS using secondary batteries other than the vehicle 1300.

As the battery pack 1200 according to this embodiment and the device, apparatus and equipment including the battery pack 1200 such as the vehicle 1300 include the above-described battery module 100, it is possible to implement the battery pack 1200 having all the above-described advantages of the battery module 100 and the device, apparatus and equipment including the battery pack 1200 such as the vehicle 1300.

The battery module of FIG. 4 is manufactured at a laboratory scale and tested for the current shutoff effect of the terminal busbar according to the present disclosure.

The battery cells of the battery module follow a method for manufacturing a general pouch-type battery cell. Example uses a busbar including a first metal layer, a material layer that is conductive in normal condition, but acts as resistance when the temperature rises and a second metal layer stacked in that order, like the terminal busbar 150' according to the present disclosure. The material layer that is conductive in normal condition, but when the temperature rises, may act as resistance, includes a gas generating material, a conductive material and an adhesive. The gas generating material is melamine cyanurate, the conductive material is silver (Ag) powder, and the adhesive is epoxy resin. The silver content is about 75~85 wt %.

Comparative example 1 uses a busbar having a single metal layer. Comparative example 2 uses a busbar having a first metal layer and a second metal layer adhered to each other with a silver epoxy resin. The materials of the first metal layers and the second metal layers of the example and the comparative example 2 and the material of the busbar of the comparative example 1 are the same. In example and comparative examples 1 and 2, the busbars have the same size.

Figure 11:
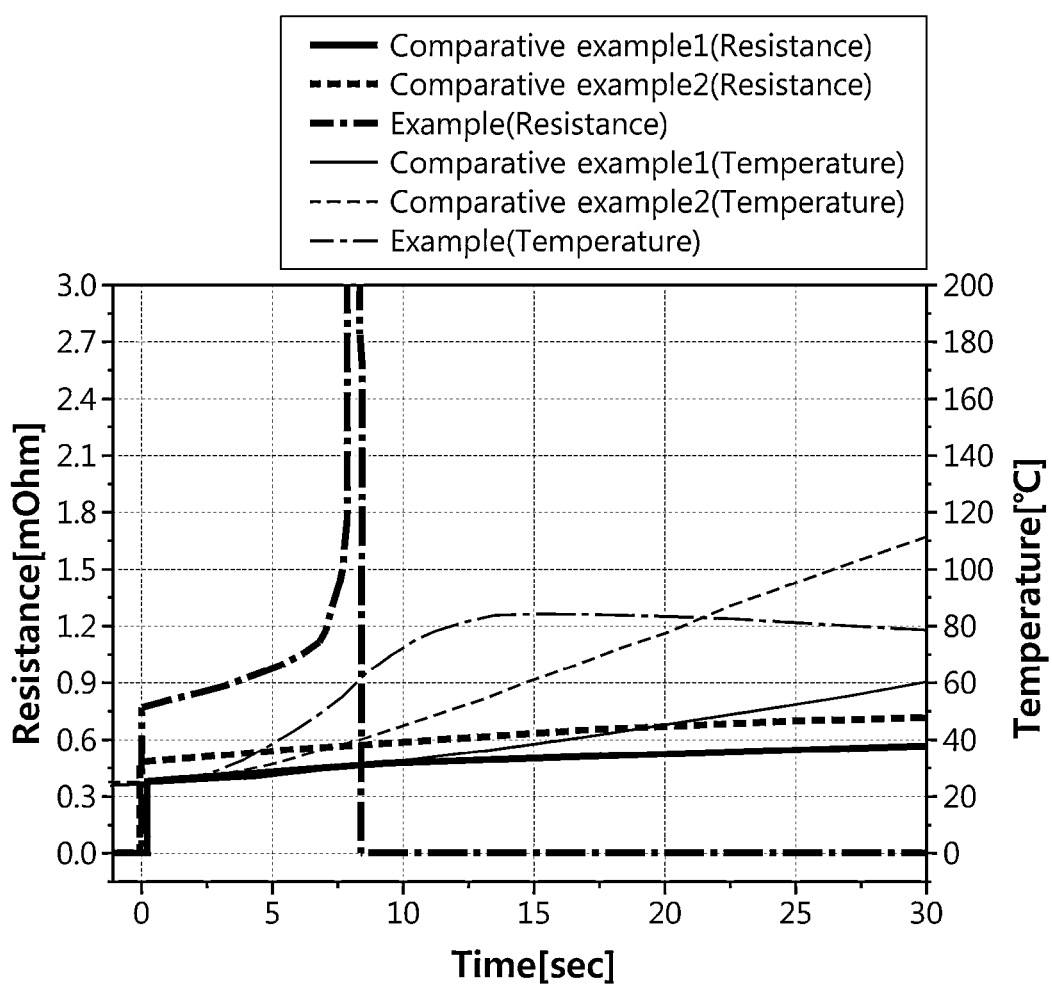
FIG. 11 is a graph showing the resistance and temperature of battery modules used in the experiment over time.

FIG. 11 is a graph showing the resistance and temperature of the battery modules used in the experiment over time. Changes in resistance and temperature over time are measured while applying an overcurrent of 600 A to the battery module. A 1000 A charger/discharger is used to apply the overcurrent, and the data measurement is made using a datalogger. The temperature at the busbar of the battery module is measured.

Referring to FIG. 11, it can be seen that comparative example 1 increases in temperature almost linearly over time, the temperature nearly reaches 60° C. at the lapse of 30 seconds, and the resistance gradually increases for the duration, while the current continuously flows through the busbar. In the case of comparative example 2, it can be seen that the temperature rises over time faster than comparative example 1, and reaches 110° C. at the lapse of 30 seconds. The resistance of comparative example 2 gradually increases a little bit more than comparative example 1, but the current continuously flows through the busbar and it is found that there is no overcurrent shutoff effect.

Figure 12A:
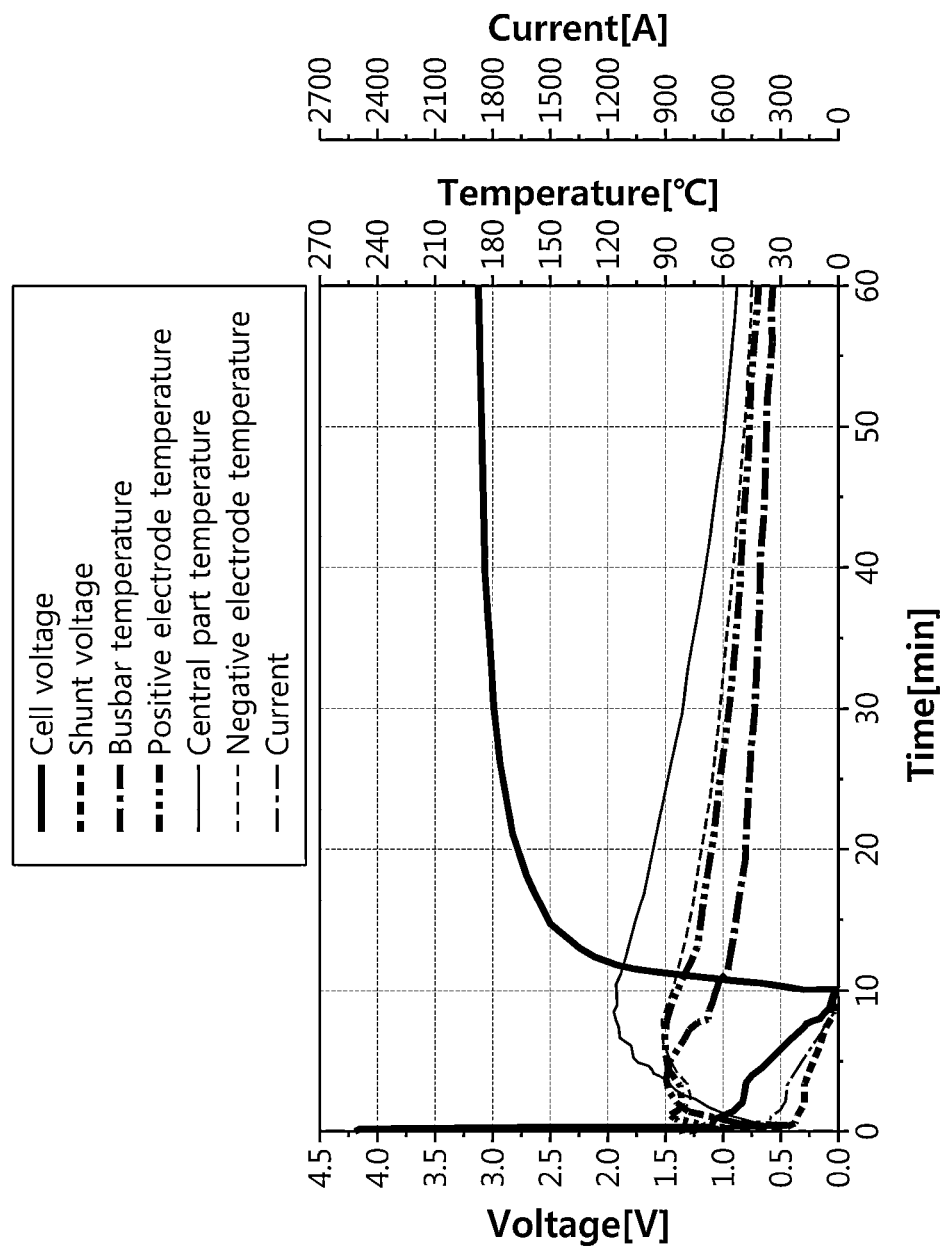
FIGS. 12a, 12b, 13a and 13b show the external short test results of battery modules used in the experiment.
Figure 12B:
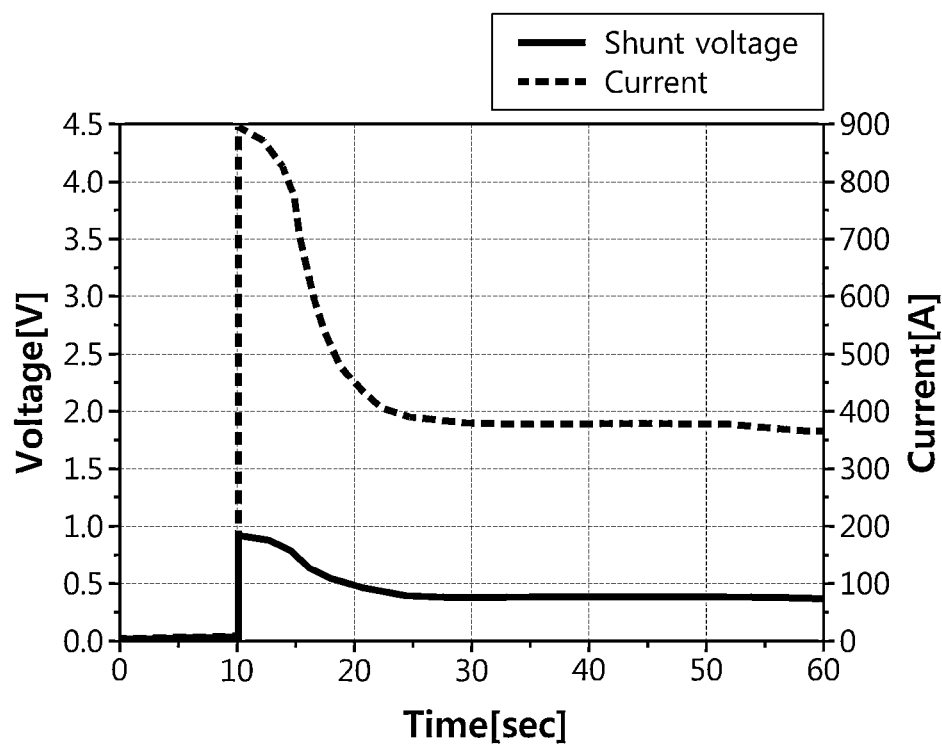
Figure 13A:
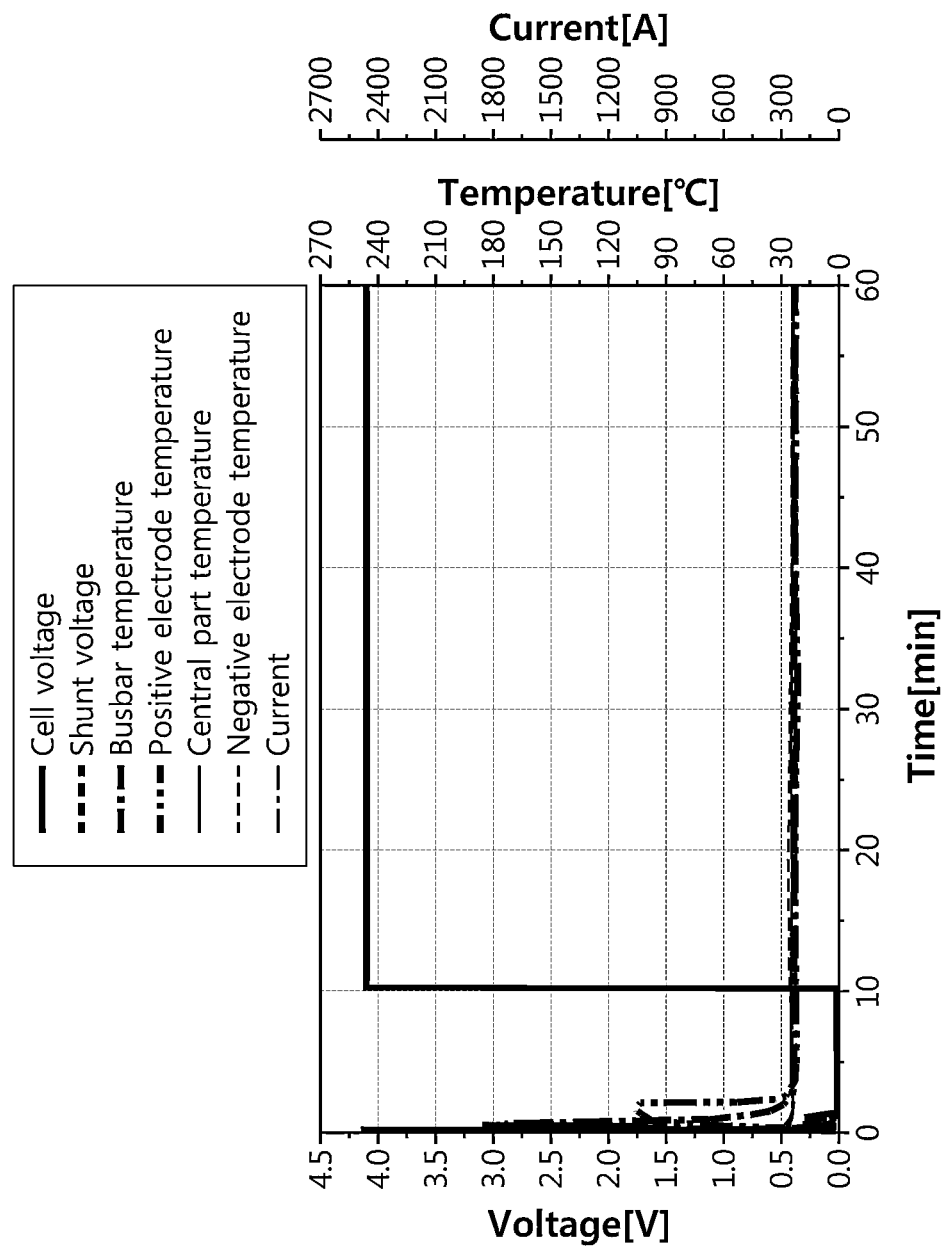
Figure 13B:
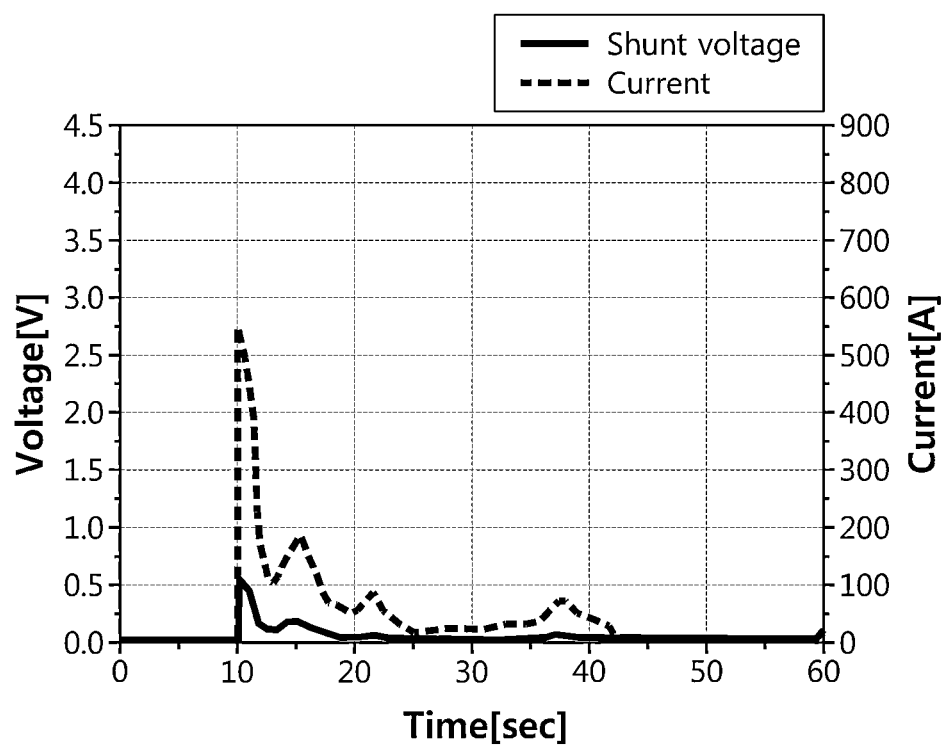

According to example, there is a rapid increase in resistance at the laps of 8 seconds, and afterwards, the measured resistance is 0, and thus it can be seen from this that resistance measurement is impossible due to overcurrent shutoff. With the increasing temperature, there is an increase/decrease in resistance, and the resistance rapidly increases at a specific temperature. Due to these temperature characteristics, the busbar according to the present disclosure may be called a PTC busbar. According to the present disclosure, it can be seen that the resistance of the busbar rapidly increases at a specific time and there is an overcurrent shutoff effect. FIGS. 12a, 12b, 13a and 13b show the external short circuit test results of the battery modules used in the experiment. FIGS. 12a and 12b show comparative example 1, and FIGS. 13a and 13b show the present disclosure example. The external short circuit test is performed by connecting in parallel the battery module to a shunt resistor having a known resistance value, measuring the shunt voltage applied to the shunt resistor while flowing a large current to cause a short circuit, and calculating the current. During the test, the cell voltage is measured, and the temperature of the busbar, the positive electrode, the negative electrode and the cell at the central part is measured. Likewise, the data measurement is made using a datalogger.

FIGS. 12a and 13a are voltage, temperature and current graphs over time, and FIGS. 12b and 13b are diagrams showing the shunt voltage and the current at the time of external short circuit.

FIGS. 12a and 13a show a result of forcibly causing an external short circuit in 10 minutes after the current is applied. As time goes by, in the case of comparative example 1 of FIG. 12a, the cell voltage is restored up to 3.15 V, while in the case of example of FIG. 13a, the cell voltage is restored up to 4.25V. The unrestored 1.1V in comparative example 1 implies that the current is not completely shut off. Seeing FIG. 12b showing the shunt voltage and the current at the time of actual external short circuit, in the case of comparative example 1, the current of 300 A or higher flows after the external short circuit, while FIG. 13b shows that the current is nearly 0 after the external short circuit.

When comparing the temperature of the busbar, in the case of the example of FIG. 13a compared with comparative example 1 of FIG. 12a, it can be seen that the resistance increases due to the rapid rise in temperature at the early stage, and as a result, the current is shut off and hardly flows. Due to the current shutoff effect of example, the positive and negative electrode temperature of comparative example 1 rise to approximately 100° C., while in the case of example, the temperature after the current shutoff is maintained at room temperature.

It can be seen through the above experimental results that the present disclosure example has a better current shutoff effect than comparative examples, and achieves a current shutoff function when the temperature actually rises.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A terminal busbar, comprising:
   a coupling portion that is a plate having a small thickness relative to a length and a width; and
   a terminal portion bent in a vertical direction at one end of the coupling portion,
   wherein the coupling portion includes a first metal plate, a material layer and a second metal plate stacked in a sequential order along an extension direction of the terminal portion, and the material layer is conductive in normal operating conditions, but acts as resistance when temperature rises above a predetermined temperature,
   wherein the material layer includes a gas generating material that decomposes at the predetermined temperature or above to produce gas, which increases resistance, and
   wherein the first metal plate is integrally formed with the terminal portion, and the second metal plate provides a connect surface with an electrode lead of the battery cell.

2. The terminal busbar according to claim 1, wherein the material layer further includes a conductive material and an adhesive.

3. The terminal busbar according to claim 1, wherein the gas generating material is melamine cyanurate.

4. The terminal busbar according to claim 2, wherein the conductive material is connected and immobilized by the adhesive, and when the gas is produced, the connection of the conductive material is disconnected and the resistance increases.

5. A method for manufacturing a terminal busbar, comprising:
   preparing a metal element having a first metal plate integrally formed with a terminal portion and an L-shaped cross section;
   forming a material layer on the first metal plate, wherein the material layer is conductive in a normal operating condition, but when temperature rises above a predetermined temperature, acts as resistance, and wherein the material layer includes a gas generating material that decomposes at the predetermined temperature or above to produce gas, which increases resistance; and
   stacking a second metal plate on the material layer.

6. The method for manufacturing a terminal busbar according to claim 5, wherein the material layer further includes a conductive material and an adhesive, and
   wherein the method further comprises pressing to adhere together after stacking the second metal plate on the material layer.

7. A battery module comprising:
   at least two battery cells, wherein each battery cell of the at least two battery cells is a pouch-type secondary battery including electrode leads of opposite polarities exposed to outside of a pouch case;
   a terminal busbar connected to the electrode lead of at least one of the battery cells,
   wherein the terminal busbar includes:
   a coupling portion that is a plate having a small thickness relative to a length and a width; and
   a terminal portion that is bent in a vertical direction at one end of the coupling portion,
   wherein the coupling portion includes a first metal plate, a material layer and a second metal layer stacked in a sequential order along an extension direction of the terminal portion, and the material layer is conductive in a normal operating condition, but acts as resistance when temperature rises above a predetermined temperature,
   wherein the material layer includes a gas generating material that decomposes at the predetermined temperature or above to produce gas, which increases resistance, and
   wherein the first metal plate is integrally formed with the terminal portion, and the second metal layer plate is connected to the electrode lead.

8. The battery module according to claim 7, wherein the material layer further includes a conductive material and an adhesive.

9. The battery module according to claim 7, wherein the gas generating material is melamine cyanurate.

10. The battery module according to claim 8, wherein the conductive material is connected and immobilized by the adhesive, and when the gas is produced, the connection of the conductive material is disconnected and the resistance increases.

11. The battery module according to claim 7, wherein a current flow path into the battery module from outside of the battery module goes through the terminal portion, the first metal plate, the material layer, the second metal plate and the electrode leads in that order.

12. A battery pack comprising:
   at least two battery modules according to claim 7; and
   an inter-busbar connecting the terminal portion of the terminal busbar of any one of the battery modules to the terminal portion of the terminal busbar of the other battery module so as to connect the battery modules.

13. A vehicle comprising at least one battery pack according to claim 12.

14. The terminal busbar according to claim 1, further comprising a hole in the coupling portion for attachment of electrode leads.

15. The terminal busbar according to claim 14, further comprising at least one hole in the terminal portion.

* * * * *